Sept. 15, 1959     W. T. ROSSELL     2,903,975
RAIL TRUCK CONSTRUCTION
Filed June 7, 1955     4 Sheets-Sheet 1
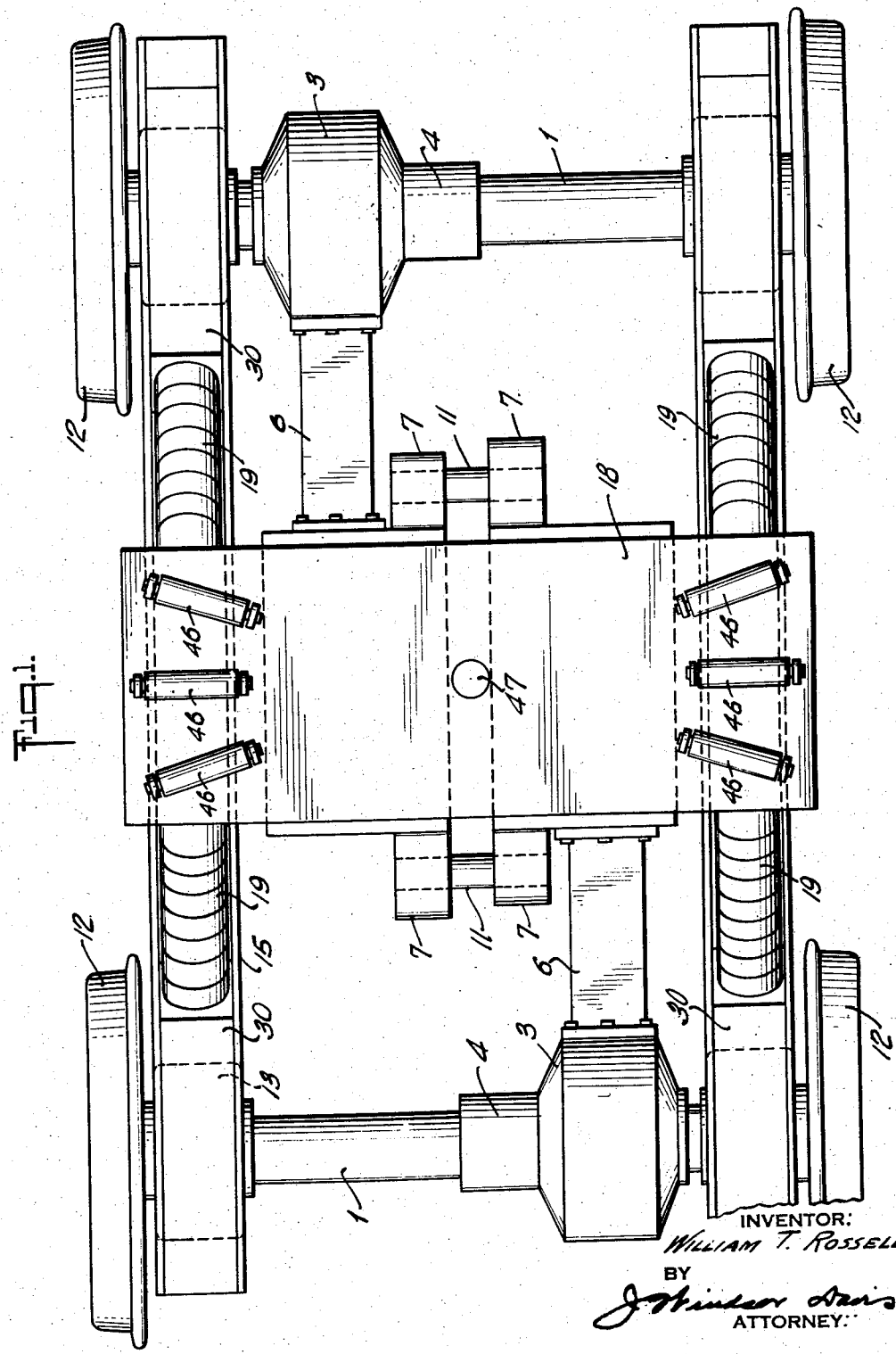
INVENTOR:
WILLIAM T. ROSSELL
BY
ATTORNEY

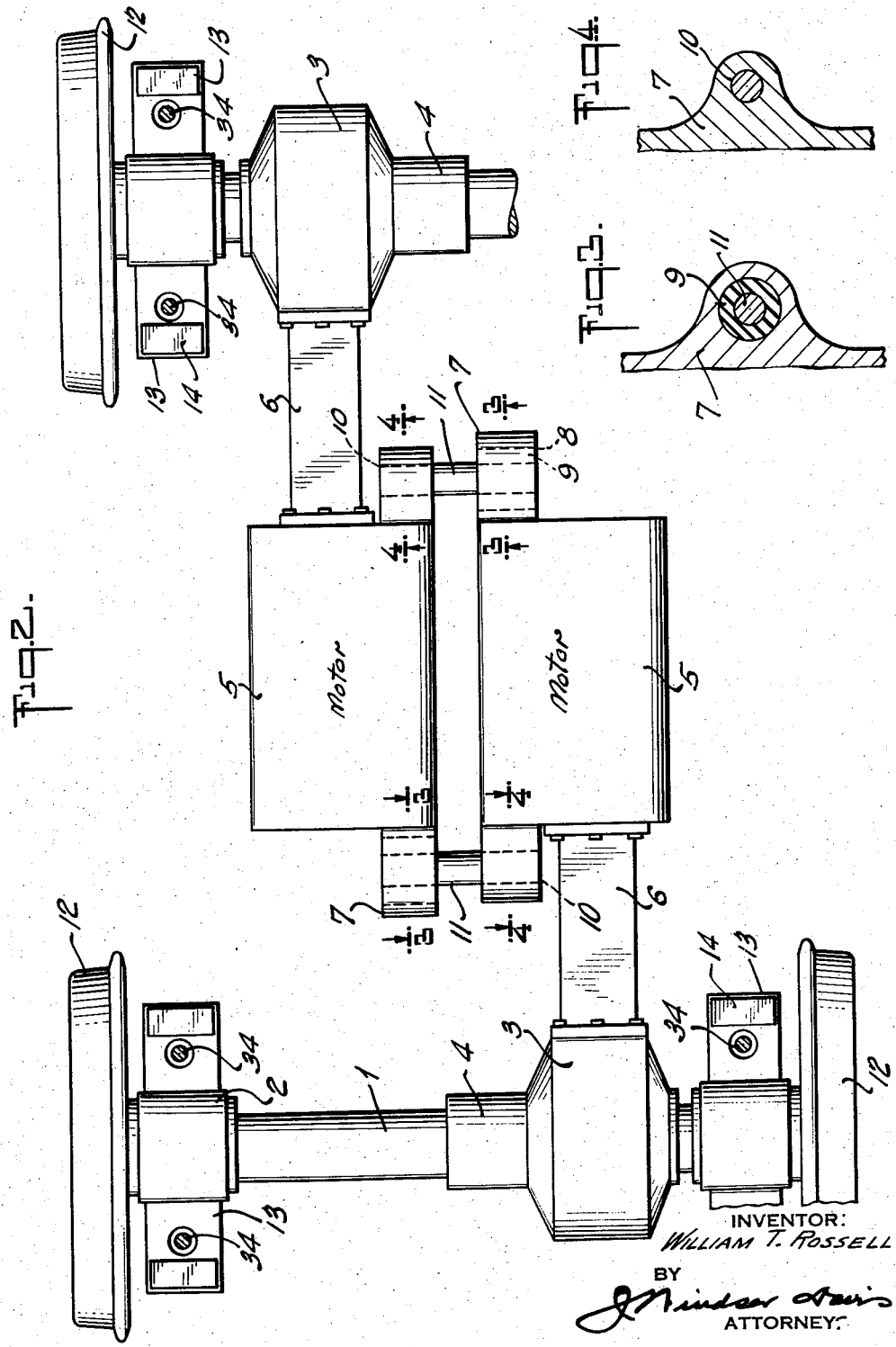

Sept. 15, 1959 W. T. ROSSELL 2,903,975
RAIL TRUCK CONSTRUCTION
Filed June 7, 1955 4 Sheets-Sheet 3
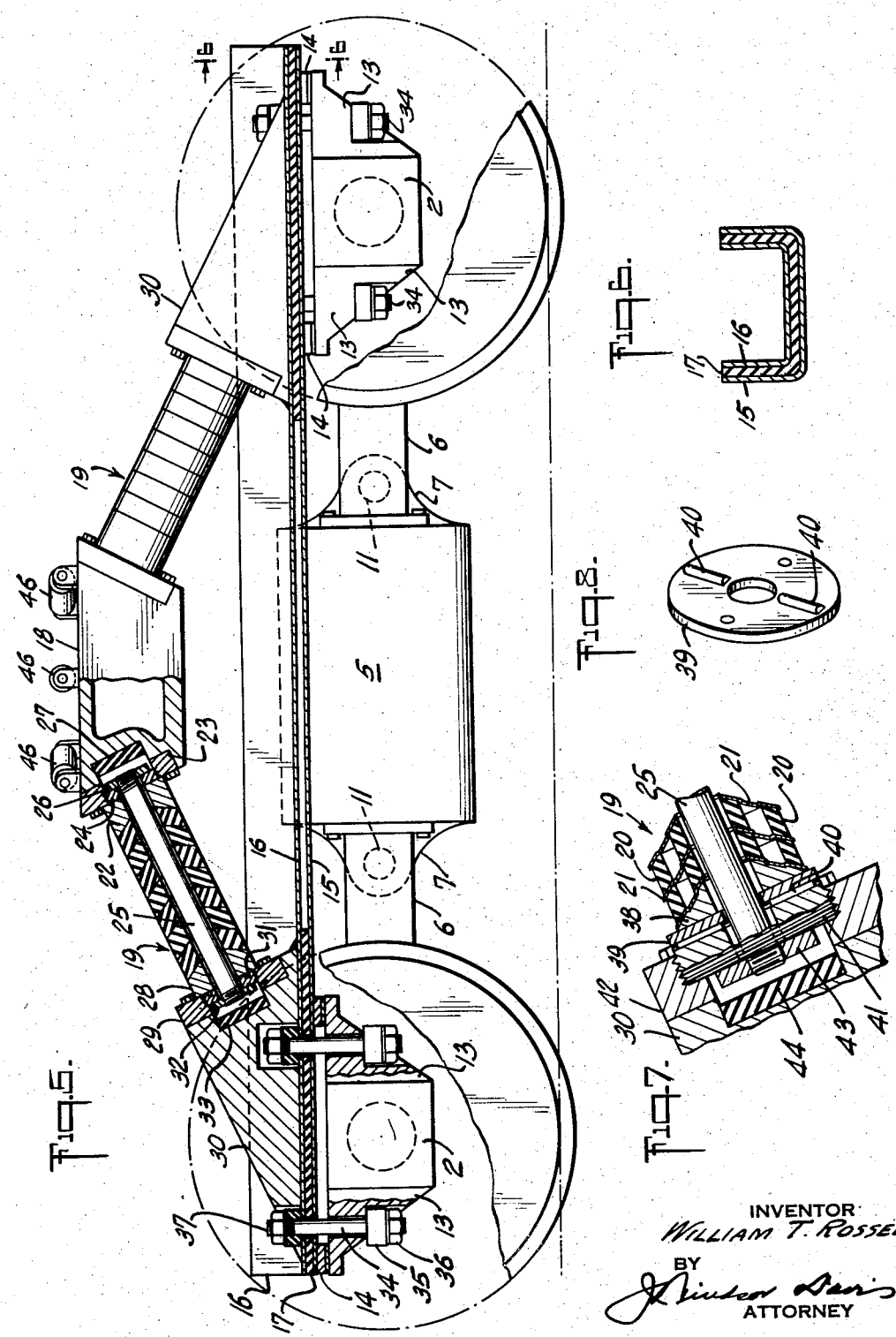
INVENTOR
WILLIAM T. ROSSELL
BY
ATTORNEY Sept. 15, 1959 W. T. ROSSELL 2,903,975
RAIL TRUCK CONSTRUCTION
Filed June 7, 1955 4 Sheets-Sheet 4
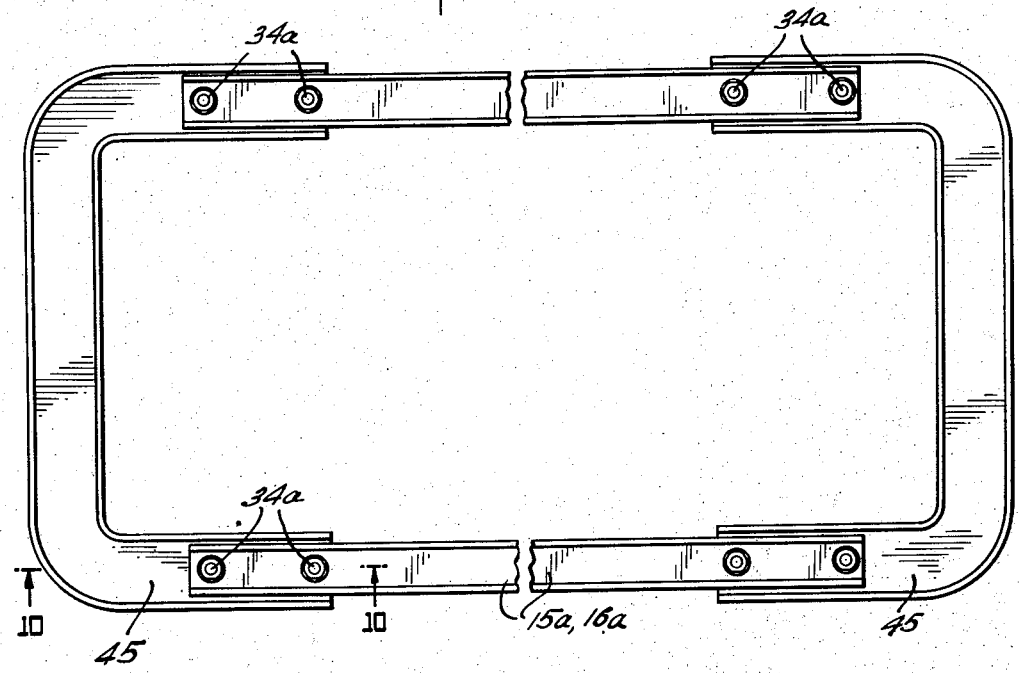
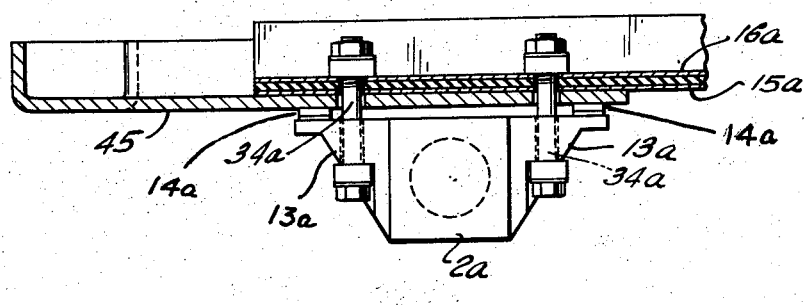
INVENTOR:
WILLIAM T. ROSSELL
BY
ATTORNEY:

United States Patent Office 2,903,975
Patented Sept. 15, 1959

2,903,975

RAIL TRUCK CONSTRUCTION

William T. Rossell, New York, N.Y., assignor to Transit Research Corporation, New York, N.Y., a corporation of New York Application June 7, 1955, Serial No. 513,646

13 Claims. (Cl. 105—197)

This invention relates to rail trucks and has for its object to provide a truck of greater safety and of better riding quality and of lighter weight, and one which will be economical to construct and readily maintained.

A principal object is to provide a truck in which the loading imposed by a car body will be accepted by a bolster and transferred to points on the truck frame immediately above the axle journal bearings, thereby reducing the danger from breakage of side rails.

A further object, as regards safety, is to provide side rails which in preferred form, are each composed of two standard channels nested one within the other and separated by rubber in such manner that if one breaks it will not be expected to fall onto the tracks but will be held temporarily in place by the other.

Another object is to provide a primary truck structure composed, essentially, of the axles, gear housings and motors with the motor housings furnishing the necessary rigidity to the assembly. In this way, the motors do not require separate hangers. This part of the truck is thus built with minimum weight.

The upper structure supported by this primary structure is composed of the side rails, the springs which rest at one end on the side rails above the journal bearings and the bolster supported by the springs at their upper ends. The side rails may be of minimum weight since they are subjected to substantially no bending stresses.

A further object of the invention is to provide improved riding quality as is accomplished, in part, by the inability of the wheels to follow a hunting motion. More specifically, the motor housings are secured together through rubber connections which thus permit the axles to move through a restricted angle with respect to each other and wth respect to the direction of the travel of the truck. The bolster supporting frame rests on the journals, being separated therefrom by friction elements. The journals are each free to move, through limited amounts, with respect to the frame but each such movement is opposed by friction and the amount of friction is proportionate to the load imposed on the side frames by the bolster, the car body and the passenger load in the body. The frictional opposition to a change in relative positions of the axes of the axles prevents the wheels from pursuing a harmonic motion inherent in hunting.

With further respect to improved riding comfort, it is an object to provide rubber springs for transferring the loading of the bolster to the truck frame, the springs being composed of a series or stack of rubber elements so shaped as to provide increasing load deflection rates under increasing loads both vertically and laterally.

Other objects and advantages will become hereinafter more fully apparent as reference is had to the accompanying drawings wherein my invention is illustrated and in which Figure 1 is a top plan view of my improved truck, Figure 2 is a top plan view of the lower truck construction including motors, gear housings, axles and three of the four wheels, Figures 3 and 4 are detail sections taken vertically along the lines 3—3 and 4—4, respectively, of Figure 2, Figure 5 is a side elevation of the truck of Figure 1 with one main spring and the construction adjacent one journal beaing being shown in vertical section, Figure 6 is a vertical section taken along the line 6—6 of Figure 5, Figure 7 is a longitudinal section of one end of a main spring and its environment similar to that seen in Figure 5, showing a modification of the spring and its seating, Figure 8 is a perspective view of the rocker plate found at the lower end of each main spring, Figure 9 is a top plan view of the frame side rails with cross members added as may be used in modification of the frame illustrated in Figures 1 and 5, and Figure 10 is a vertical section taken along the line 10—10 of Figure 9, showing also a journal bearing assembly.

Referring first to Figure 2, the numeral 1 refers to the axles which have journal bearings 2 at each end thereof and driving gears (not shown) intermediate their ends. The gears are contained in the gear housings 3 which extend substantially along the axles at 4. Motors 5 have propeller shafts (not shown) contained in propeller shaft housings 6. These housings are connected at one end to a gear housing 3 and at their other end to the housing of their motor 5. The motors 5 are provided with integral flanges 7 at each end thereof, one of which is provided with a comparatively large hole 8 to receive a rubber washer or bushing 9 while the other is provided with a smaller hole 10 to receive a pin 11 in driving fit therewith. The pins 11 extend axially through the rubber washers 9 thus connecting the motor housings firmly together but permitting slight relative movements.

It will thus be seen that the housings of the oppositely facing motors, the propeller shaft housings 6 and the gear housings 3 with their extensions 4 constitute a lower truck frame for the axles 1 and their wheels 12, and that this frame allows a small amount of relative movement of the axes of the axles 1 as may be necessary for the wheels 12 to follow unevennesses in rail elevations and to allow out of parallel relation of the axles in following curves of the rails.

As will be seen in Figure 2 and also in Figure 5, the journal bearings 2 are provided with integral extensions 13 extending fore and aft of their casings with respect to their direction of travel. Atop each of these extensions a friction element 14 is anchored.

Resting on the four friction elements at each side of the truck is an upper frame which consists, first, of the side rails 15 and 16 which are U-shaped channel members nested together and separated by rather thin rubber pads 17. Two members are employed instead of one so that in the event of the breakage of either the other will act as a support or retainer to prevent its falling onto the tracks. The rubber pads therebetween absorb a substantial amount of high frequency vibrations en route from the wheels to the car body.

The side rails 15, 16 each supports one end of a bolster 18 through two springs 19 here shown as being inclined about 30° to the horizontal. These springs, as shown in detail in Figure 7, each made of a series or stack of frusto conical rubber elements 20 each surface bonded to one frusto conical metallic member 21. The upper spring cap 22 rests against a removable plate 23 bolted to the bolster 18. This plate 23 has a retainer 24 screw threaded therein. A rod 25 extends freely through all elements 20, 21, 22, 23 and 24 and has a nut 26 threaded on the end thereof which resides in a depression formed in the bolster 18. The depression has a rubber pad 27 in the bottom thereof. It will thus be seen that the bolster can not be lifted from the springs 19 because the nut 26 can not pass the retainer 24, and, furthermore, the bolster can not over stress the springs 19 because the nut 26 will contact the pad 27, in dashpot fashion, thus limiting the deflection of the springs.

In Figure 5, the lower end of each spring 19 is equipped with a filler 28 which rests against a removable plate 29 bolted to the lower spring seat 30. Threaded in the plate 29 is a retainer 31 through which the lower end of the rod 25 extends. The seat 30 has a depression formed for the purpose and the nut 32 on the end of the rod 25 resides within this depression. A rubber pad 33 at the bottom of the depression acts to limit the travel of the rod 25 by forming a stop for the nut 32 and, in case of attempt to lift a spring 19 from its seat 30, the nut 32 contacts the retainer 31.

It will be noted that the spring seat 30 is secured to the upper side rail channel 16 immediately above a journal bearing so that the weight imposed by the bolster is transmitted through the springs 19 to an area on the side rails immediately above the journals thereby avoiding bending stresses in the side rails. The side rails may thus be of light-weight construction and, in fact, may simply be selected from standard channels such as are made by a number of steel fabricating companies. In order to limit the movement of the side rails, 15, 16 with respect to the journals, appropriate recesses are provided in the seats 30, and aligned openings are provided through the side rails and through each extension 13 of the journal bearings. Bolts 34 of smaller diameter than these openings extend therethrough and are each provided with rubber washers 35 at each end separating the nut 36 and head 37 of the bolts respectively from direct contact with their extension 13 and their side rail 16. Relative movement of the side rails 15, 16 with respect to the friction elements 14 is thus permitted to the extent of the clearance of the bolts 34 in the openings through the extensions 13 and the side rails. The relative movement of the axes of the axles 1 is, of course, resiliently opposed by the rubber connections 9 at the motors, also.

Figure 7 illustrates a modified form of the assembly at the lower end of the springs 19. In this case, a filler 38 for the lowermost metallic element 21 is secured to a spring cap 39 having a rocker 40 exteriorly thereof. This rocker has a seat in a threaded retainer 41 screw threaded into a plate 42 bolted to the spring seat 30. The rod 25 passes through the cap 39 and through the retainer 41 where it enters a depression in the seat 30. A nut 43 on the end of the rod 25 has substantial clearance with respect to a rubber bumper pad 44 in the bottom of the depression and its diameter is such that it can not pass through the opening in the retainer 41 through which the rod 25 extends. Elevation of the bolster 18 therefore can not lift the springs 19 from assembly with the seats 30.

As illustrated in Figures 1 and 5, no cross-members are provided directly connecting the side rails 15, 16 at opposite sides of the truck. This will be satisfactory for some services, however, it will be possible for the axles to assume a position of parallelism with each other but out of normal with respect to the side rails. If that condition should become noticeable or objectionable it may be overcome by the construction illustrated in Figures 9 and 10. In this form the side rails 15a, 16a correspond to the side rails 15 and 16 of Figures 1 and 5. These members are each elevated from the friction elements 14a of the journal bearings 2a so that the ends of a cross-member 45 may be inserted therebetween. These cross-members 45 are U-shaped in plan view to span the width of the truck and they are also U-shaped in cross-section to receive the side rails 15, 16 in nested fashion. The ends of these cross-members substantially overlap the ends of the side rails and have frictional contact therewith. They are provided with openings larger than the diameters of the bolts 34a aligned with the bolt receiving openings in the members 13a, 15a and 16a. Thus, movement of the journal bearings 2a with respect to the side rails 15a, 16a is opposed by friction between the elements 14a and the cross-members 45 and by friction between the members 15a and 45, the maximum movements thereof in any direction being limited by the bolts 34a.

The bolster 18 supports a car body by the rollers 46 located at the outer ends of the bolster as shown in Figures 1 and 5. The weight is thus directly over the ends of the springs 19 so that the bolster may be of very light construction. An opening 47 for a king pin is provided in the bolster.

Various changes may be made without departing from the spirit of my invention and I therefore desire to be extended protection as defined by the appended claims.

What I claim is:

1. In a rail truck, oppositely faced driving motors having their housings resiliently connected together for slight relative angular movements, axles each having gearing, a propeller shaft connecting each of said gearings to one of said motors, a housing enclosing each of said gearings and enveloping also a substantial portion of the length of said axles, and a housing for each of said propeller shafts connecting one of said gear housing to one of said motor housings, said motor housings and said propeller shaft housings serving as guiding and controlling means for said axles.

2. In a rail truck, two spaced axles each having a journal bearing at each end thereof, side frames supported by said journal bearings, a bolster, and springs supporting said bolster from said side frames, said springs being inclined and each having a spring seat for its lower end directly above one of said journal bearings.

3. In a rail truck, two spaced axles each having a journal bearing at each end thereof, side frames supported by said journal bearings, a bolster, and springs supporting said bolster from said side frames, said springs each being composed of a stack of frusto-conical rubber elements surface-bonded to a frusto-conical metallic element whereby to resist the vertical loading by compression stresses and the lateral loading by shear and bending stresses, said springs each residing at an angle to the vertical and each having spring seats at their lower ends immediately above said journal boxes.

4. In a rail truck, side frames, a bolster, and spring assemblies supporting each end of said bolster from said side frames comprising two inclined springs, each of said springs comprising a stack of frusto-conical rubber elements each surface-bonded to frusto-conical metallic members, each of said springs having a spring cap at its lower end having a rocker on the surface thereof exteriorly of its spring, said rockers all being placed normal to the length of said side rails, a spring seat for each of said rockers anchored to its side rails immediately above one of said journal bearings, and a stiff rod extending freely through said elements and through said spring seats maintaining said elements in assembly with respect to said bolster and said spring seats.

5. A rail truck comprising spaced axles each having journal bearings at each end thereof, said bearings each having at least one friction element resting thereon and anchored thereto, side rails resting on said friction elements and movable fore and aft of the truck with respect to said journal bearings, means limiting the maximum relative movements of said side rails with respect to said bearings, a bolster, and springs supporting each end of said bolster from said side rails, said springs each being inclined to the vertical and being supported at their lower ends in spring seats anchored to said side rails directly above said journal bearings.

6. A rail truck comprising spaced axles each having journal bearings at their ends and driving gears intermediate their ends, oppositely faced motors having their housings resiliently connected together for slight relative movements, a propeller shaft connecting each of said motors with the driving gears of one of said axles, a gear housing for the driving gears of each of said axles enveloping also a substantial portion of said axles, a propeller shaft housing connecting each of said gear housings with the housing of one of said motors, said axles being capable of relative movements of their axes with respect to each other by virtue of the resilient connection of said motor housings, said journal bearings having friction surfaces at the uppermost portion thereof, side rails resting on said friction surfaces, whereby relative movements of the axes of said axles is opposed by the frictional contact of said side rails with said friction elements, means limiting the maximum relative movements of said journal bearings and said side rails, a bolster and springs supporting said bolster from said side rails.

7. A frame for a rail truck comprising side rails and cross members connecting said side rails, said side rails each comprising U-shaped channel members separated by rubber pads, said cross members also being channel members U-shaped in top plan view and U-shaped in cross-section and having their ends nested wtih respect to said side rails.

8. A frame for a rail truck comprising cross members U-shaped in plan view and side rails, said side rails and said cross members all being U-shaped in cross-section and in nested relation at their ends, said side rails being relatively movable against friction with respect to said cross members.

9. A rail truck comprising axles having journal bearings at each end thereof, a frame supported by said journal bearings having side rails relatively movable with respect thereto against friction, said frame having cross members also supported at their ends by said journal bearings with their ends overlapping the ends of said side rails, said cross members being movable against friction with respect to said journal bearings and said side rails.

10. A rail truck comprising axles having journal bearings at each end thereof, a frame supported by said journal bearings having side rails relatively movable with respect thereto against friction, said frame having cross members also supported at their ends by said journal bearings with their ends overlapping the ends of said side rails, said cross members being movable against friction with respect to said journal bearings and said side rails, and means anchored to said journal bearings limiting the relative movements of said cross members and said side rails with respect thereto.

11. In combination, a journal bearing assembly for a rail truck comprising a journal bearing casing having integral extensions fore and aft of its direction of travel, said extensions having friction elements atop thereof, a side rail end resting on said friction elements and movable longitudinally with respect thereto and means limiting the relative movements of said frame ends with respect to said friction elements.

12. In combination, a journal bearing assembly for a rail truck comprising a journal bearing casing having extensions integral therewith and situated fore and aft of its direction of travel, said extensions having friction elements atop thereof, a side rail end resting on said friction elements and relatively movable horizontally with respect thereto, a bolt extending freely through each of said extensions and said side rail end, said bolts each having a head on one end and a nut on the other end, and a rubber washer interiorly of each of said heads and said nuts contacting said extensions and said rail end respectively whereby said bolts limit the relative movements of said rail end with respect to said journal bearing casing.

13. In a rail truck, axles having journal bearings at each end thereof, a truck frame comprising side rails supported by said bearings, a bolster, angularly disposed springs supporting said bolster from said side rails, said springs at their lower ends having spring seats secured to said side rails directly over said bearings, said bolster having body supporting rollers near the ends thereof whereby the weight of a car body is transmitted substantially vertically to said journal bearings.

References Cited in the file of this patent

UNITED STATES PATENTS

| 1,226,756 | Dougherty | May 22, 1917 |
| 1,484,954 | Masury | Feb. 26, 1924 |
| 1,550,307 | Elliott | Aug. 18, 1925 |
| 1,992,506 | Saurer | Feb. 26, 1935 |
| 2,023,756 | Brownyer | Dec. 10, 1935 |
| 2,051,074 | Burrows et al. | Aug. 18, 1936 |
| 2,287,575 | Sensenich | June 23, 1942 |
| 2,740,359 | Travilla | Apr. 3, 1956 |
| 2,754,768 | Hile | July 17, 1956 |

FOREIGN PATENTS

| 747,137 | France | June 12, 1933 |
| 402,514 | Italy | Mar. 12, 1943 |
| 131,738 | Sweden | May 22, 1951 |